Jan. 5, 1965   J. W. KING ETAL   3,164,683
ROTARY HEAD POSITION DETERMINING APPARATUS
Filed Sept. 30, 1959   2 Sheets-Sheet 1
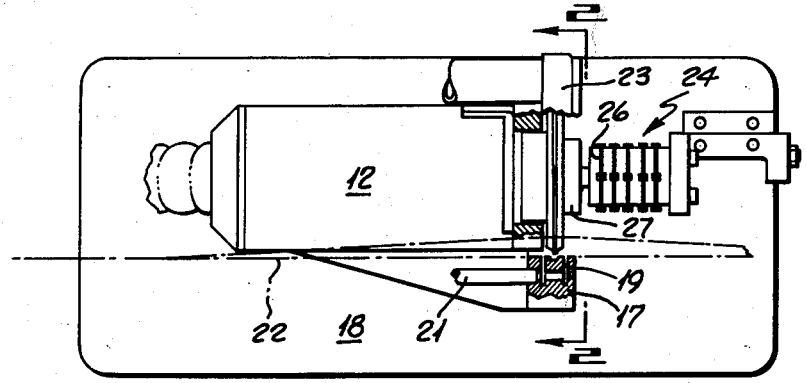
FIG_1
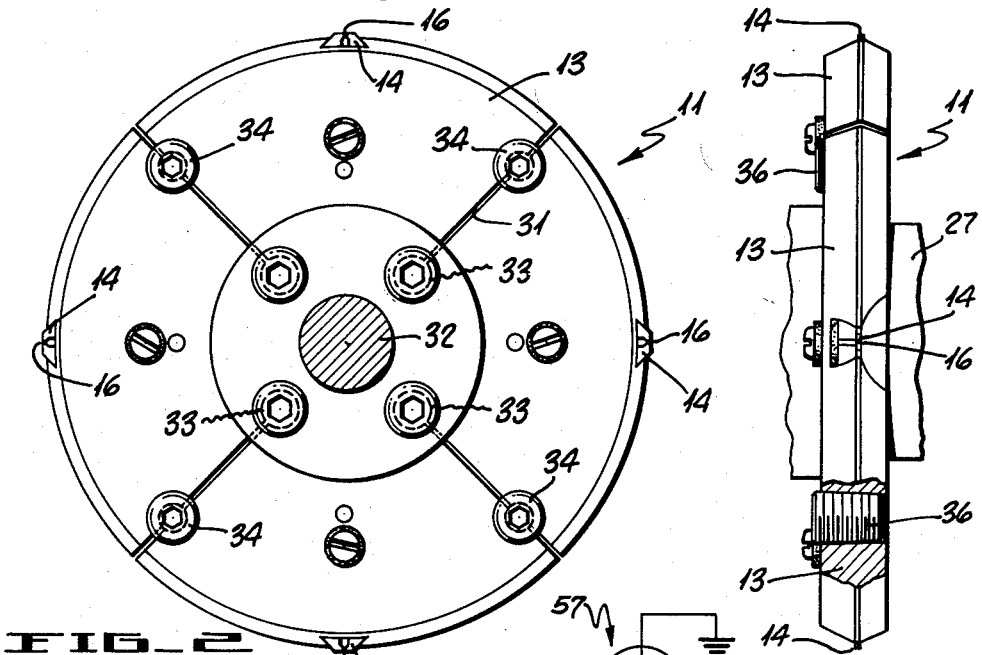
FIG_2   FIG_3
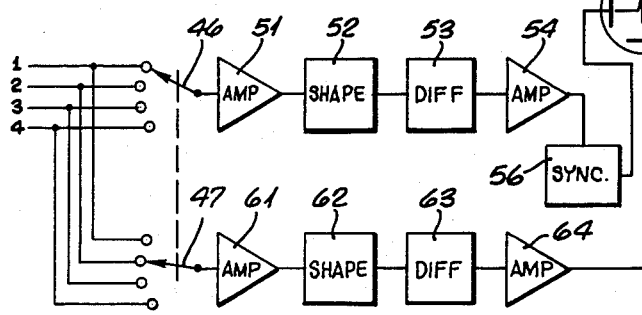
FIG_4
JOHN W. KING &
ROBERT F. PFOST
INVENTORS
BY
ATTORNEYS

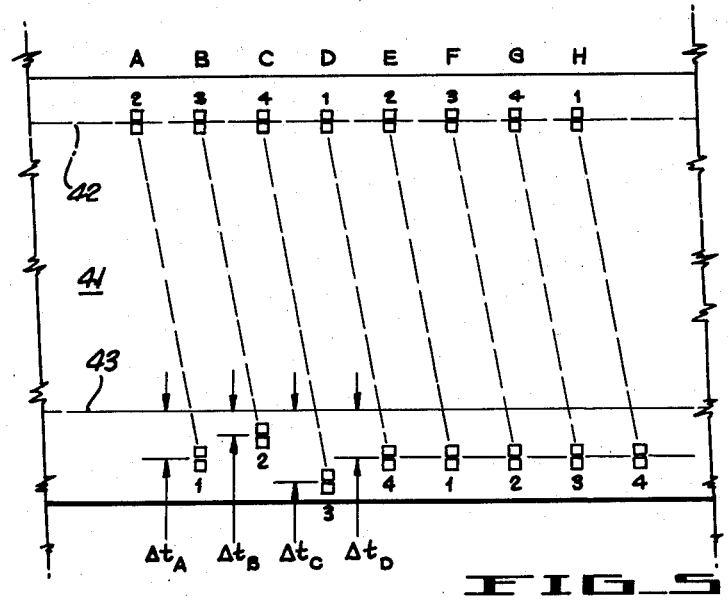
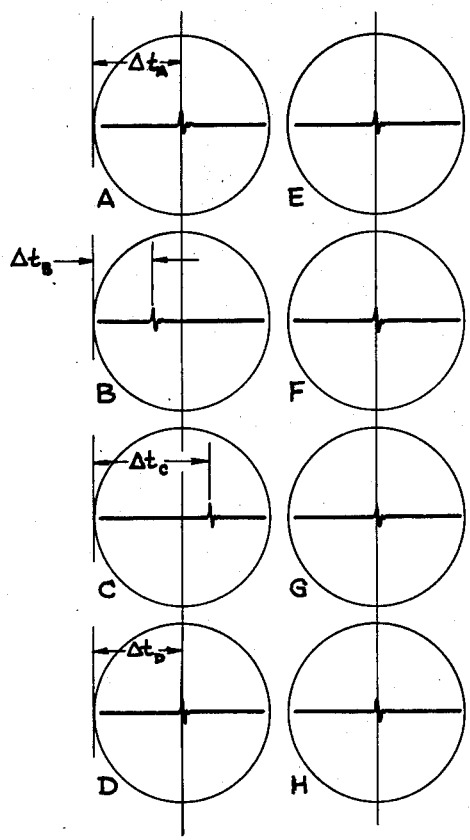
FIG_5
FIG_6
JOHN W. KING &
ROBERT F. PFOST
INVENTORS
BY
ATTORNEYS United States Patent Office  3,164,683
Patented Jan. 5, 1965

3,164,683
ROTARY HEAD POSITION DETERMINING
APPARATUS
John W. King, Palo Alto, and Robert F. Pfost, Mountain View, Calif., assignors to Ampex Corporation, Redwood City, Calif., a corporation of California
Filed Sept. 30, 1959, Ser. No. 843,493
7 Claims. (Cl. 179—100.2)

This invention relates generally to an apparatus and method for determining the arcuate displacement between transducer units mounted on a rotary transducer assembly.

In Patent No. 2,866,012, there is disclosed a system and apparatus making use of a rotary transducer assembly for recording and reproducing signals over a wide frequency spectrum. The transducer assembly employed in the apparatus comprises a plurality of transducer units that are mounted to rotate and sweep across a pliable tape-like record medium, such as that which is commonly referred to as magnetic tape. Special means are employed for driving the head assembly and magnetic tape to assure proper control of speed of the rotation of the head and tape speed across the head, and to insure proper tracking during playback.

Systems of the above character involve separated record track portions extending across the tape, each track portion being formed by the sweep of a transducer unit. During playback, current variations provided by each unit as it sweeps across a track portion are combined in electronic circuitry to form a composite signal. The accuracy with which the signal is recorded and reproduced is dependent, among other things, upon the mechanical accuracy to which the rotary head is constructed. Slight differences in the angular spacing between the tips of the transducer units cause inaccuracies in the reproduced composite signal. Assuming the reproduction of recorded television signals on a screen, such inaccuracies are evidenced by shifting between horizontal bands of the television picture.

In copending application Serial No. 689,594, filed October 11, 1957, now Patent No. 3,020,359, there is described a rotary head which is constructed in such a manner as to provide simple adjustment for precise accurate angular spacing of the transducer units. The assembly comprises a drum-like head adapted to be rotatably mounted to a shaft. A plurality of slots extends inwardly from the outer periphery of the drum whereby the drum is divided into a plurality of connected sectors. A transducer unit is mounted on each of the sectors with the operating tips of the transducer unit disposed to rotate through a common circular sweep path for contact with a tape-like medium. Means are provided for adjusting the angular relationship between the transducer units.

In general, the angular relationship has been achieved by taking care during assembly to obtain accurate location of the pole tips. After the transducer units have been mounted, the assembly is placed on a recording and reproducing apparatus. A standard recording is reproduced and the picture is observed on a monitor screen. The extent of shifting of bands of horizontal lines is noted. The operator makes adjustment of the angularity until distortions in the picture are eliminated.

It is apparent that it is desirable to provide an adjustment which is not dependent upon the visual observation of the reproduced picture whereby the adjustment can be made with a considerably greater degree of accuracy.

It is, therefore, an object of the present invention to provide an apparatus and method for accurately adjusting the angularity between transducing units mounted on a rotary drum.

It is another object of the present invention to provide an apparatus and method in which adjacent heads generate a reference and a timing pulse with the timing between pulses of adjacent units indicating the angularity between the same.

These and other objects of the invention will become more clearly apparent from the following description when taken in conjunction with the accompanying drawing.

Referring to the drawing:
FIGURE 1 is a plan view, partly in section, illustrating a transducing apparatus which employs a rotary transducer assembly;
FIGURE 2 is a view taken along the line 2—2 of FIGURE 1 showing the rotary transducer assembly;
FIGURE 3 is a side elevational view of the assembly of FIGURE 2 with parts broken away to show one of the adjusting screws;
FIGURE 4 is a schematic diagram showing the connection to the head units and the electrical circuitry employed to derive pulses for application to an associated oscilloscope for indicating the angularity;
FIGURE 5 is an enlarged view of a portion of tape showing the relationship of the magnetic transducer units at different points in time; and
FIGURE 6 shows the oscilloscope display corresponding to the position of the heads shown in FIGURE 5.

The apparatus illustrated in FIGURES 1, 2 and 3 consists of a head asesmbly 11 which is driven by an electric motor 12. The head assembly comprises a disc or drum 13 which serves to mount a plurality of transducer units 14 with their tips extending beyond the periphery of the drum 13. Each of the transducer units can consist of a magnetic core which carries a coil winding and which includes a recording gap 16. A suitable construction of a rotary head of this type is described in detail in copending application Serial No. 689,594, filed October 11, 1957, now Patent No. 3,020,359.

The rotary head assembly and a guide 17 are carried on a base plate 18. The tape guide 17 serves to present the magnetic tape to the rotary head assembly. The guide 17 may include slots 19 which are connected to a vacuum source at 21. By applying a vacuum to these slots, the tape 22 is held in engagement with the guide as it is driven longitudinally past the rotating head assembly. The guide 17 may be adjustably mounted on the base 18 whereby it may be moved towards and away from the transducer assembly to adjust the pressure between the transducers and tape.

A housing 23 is carried by the base and serves to partially enclose the rotary head assembly. A slip ring assembly 24 is carried by the base 18 and provides means for making electrical connection to the various transducer units of the rotary transducer assembly. The slip ring assembly may include stationary brushes 26 and rotatable slip rings 27 adapted to rotate with the transducer head assembly.

To provide means for precise adjustment of the angularity between the transducer units, the rotary drum 13 is divided into a plurality of sectors with each sector serving to mount one of the transducer units. Thus, as shown in FIGURE 2, radially extending slots 31 extend from the outer periphery to a point near the central opening 32. For convenience and to relieve stress, the inner ends of these slots may terminate in openings 33 which may be used for the attachment of associated parts, if desired. Each slot is interrupted by a threaded tapered opening 34 which accommodates an adjusting screw 36, FIGURE 3. All of the adjusting screws are tapered whereby when a screw is advanced, it will cause slight spreading of the associated slot.

In accordance with the present invention, the recording tape-like medium 41, FIGURE 5, has recorded thereon two very narrow parrallel record tracks 42 and 43 which are spaced apart a distance which corresponds generally to the spacing of a pair of transducer heads. As will be presently described, the absolute spacing is not critical. However, it must be held constant throughout the length of any one tape. The tracks 42 and 43 may, for example, be formed by turning off the motor 12 and adjusting the position of the rotary head assembly 11 until two of the record heads 14 are in contact with the tape. A direct current is then applied to the heads and the tape transport is energized to move the tape longitudinally past the stationary heads whereby a pair of spaced parallel magnetized tracks is formed.

After the tracks have been formed, the tape is rewound. The apparatus is operated in a conventional manner with the motor 12 energized whereby the rotary head assembly is rotating as the tape is driven lengthwise past the same. It will be observed that as each transducer unit crosses one of the tracks 42 and 43, a signal is induced in the respective transducer.

The signals are applied to electronic networks which serve to shape them to form pulses of substantially square waveform. These are then differentiated to generate relatively short pulses for application to an oscilloscope.

Referring to FIGURE 4, a suitable network is schematically illustrated. Thus, the transducers or heads 1–4 are connected to the contacts of switches 46 and 47 with the wiper arm of the switches interconnected to simultaneously rotate and make connection to predetermined heads. It is observed that when the wiper of switch 46 is in contact with head number 1, the wiper on switch 47 is connected to head number 2. It is seen that in any position the wiper on switch 46 will be positioned to the forward transducer, while the wiper on switch 47 will be positioned to the next transducer.

Referring to the circuitry associated with the wiper of switch 46, it is seen that the signal at the wiper is amplified 51, shaped 52, differentiated 53, to provide a sharp pulse, amplified 54, and applied to the sync circuit 56 of the oscilloscope 57. The wiper 47 is connected to a similar electronic network, including the amplifier 61, shaper 62, differentiator 63 and amplifier 64. The output of the amplifier 64 is applied to the vertical deflection circuits of the oscilloscope.

When the transducer connected to head number 1 through the wiper 46 passes the recorded track 43, a synchronizing or reference pulse is formed which triggers the scope to start a horizontal sweep. As soon as transducer number 2 associated with the wiper 47 crosses the track 42, it will form a pulse which is displayed on the oscilloscope. Assuming the spacing of the tracks is less than the head spacing, the pulse will be displayed at a time $\Delta t_A$ (FIGURE 5) after the sweep starts. This indicates that the spacing of the heads is more than the spacing of the recorded tracks by an amount represented by $\Delta t_A$.

Referring to FIGURES 5 and 6, the operation may be more clearly understood. Assuming that the magnetic transducer assembly is rotating so that each head engages successively the tracks 42 and 43, it is observed that, when the switch is connected as shown in FIGURE 4 (the horizontal circuits connected to transducer number 1 and the vertical deflection circuits to the transducer number 2), the transducer number 1 has crossed the line 43 and that a period of time $\Delta t_A$ thereafter, transducer number 2 crosses the line 42. Thus, the sweep was started when transducer number 1 crossed the line 43, and the vertical deflection takes place a period of time $\Delta t_A$ thereafter, as shown in FIGURE 6A.

Similarly, by adjusting the position of wipers 46 and 47 of the switches, the conditions shown at B, C, and D (FIGURE 5) may prevail. In condition B, the transducer 2 triggers the sweep circuit of the oscilloscope while transducer 3 forms the pulse. It is seen in the illustrative example that the transducers are more closely spaced and that the time $\Delta t_B$ is less than the time $\Delta t_A$. Similarly, in position C, transducer 3 triggers while transducer 4 forms the vertical deflection. It is observed in the illustrative example that the heads have a greater spacing than the foregoing. Thus, the time $\Delta t_C$ is greater than $\Delta t_A$ and $\Delta t_B$ as indicated in FIGURE 6. In condition D, transducer 4 triggers while transducer 1 causes vertical deflection. This is illustrated in FIGURE 6D.

By examining the four displays, it is seen that the mean value is at the vertical line. It can further be observed that the heads 2 and 3 are too closely spaced since the time $\Delta t_B$ is less than the mean value, while the heads 3 and 4 are spaced too far apart since the time $\Delta t_C$ is too great. It is further observed that the spacing of heads 1 and 2, and 1 and 4 is substantially correct. By varying the position of the head 3, the angularity between the head 3 and the adjacent heads 2 and 4 can be corrected. With this adjustment made, the apparatus is again turned on and if the adjustment is correct the oscilloscope representation for the four positions of the wipers 46 and 47 will be as shown in FIGURES 6E, F, G and H.

It will be observed that, if the longitudinal lines are formed by employing the rotary transducers, as previously described, and the spacing is correct, the pulses will be coincident. There will, therefore, be no display on the scope. However, an adjustment of the guide may be made whereby the representations will appear in the center of the scope.

Since this is a comparative method, the absolute distance between the lines is unimportant. By sequentially moving the switch from position 1 through position 4, the relative distance between the heads is indicated by the point where the pulse applied to the Y axis falls on the scope trace. The preferred procedure is to determine the mean position of the pulses for the four head pairs. The tapered screws are then adjusted so that the pulses all fall on the same spot as the switch is rotated through its four positions.

The direction of adjustment may be reasoned quite easily. For example, if the scope is being triggered by the leading head and if the pulse falls to the right of the mean value, the angle between the heads is too large. As the errors are reduced, it is possible to expand the sweep on the scope and thereby increase the sensitivity of the indicator. Typically, time displacements corresponding to linear displacements as small as fifteen micro-inches can be determined.

As an alternate technique, it is possible to employ a single longitudinal track if a delay line delays the reference signal to cause it to coincide with the pulse from the succeeding head.

It is observed that the time lapse between the pulses is representative of the spacing of the transducer units, and that, if this time can be equalized, the spacing of the units will be likewise equalized. Means other than oscilloscope displays may be used for determining the time lapse between pulses. For example, the reference and timing pulses may be employed to start and stop an electronic time interval device such as an electronic counter. The time intervals can then be easily compared and the head spacing adjusted. A single narrow track is suitable for forming the pulses when a time interval device of the electronic type is employed.

Thus, it is seen that there is provided an improved method and apparatus for accurately adjusting the angularity between the transducer units of a rotary head assembly. The method does not depend upon visual acuity of the observer, but rather it is accurately determined by an electronic circuit.

We claim:

1. Apparatus for determining the spacing of a plurality of transducer units mounted on a rotary member which comprises a member having a relatively narrow predetermined track recorded thereon, means for causing the transducer units to successively sweep substantially transversely across said relatively narrow recorded track at a substantially constant rate, each of said transducers serving to form a pulse as it crosses the recorded track, and means for determining the time interval between pulses.

2. Apparatus for equalizing the arcuate displacement of a plurality of transducer units mounted on a rotary member which comprises a member having a relatively narrow track recorded thereon, means for causing the transducer unit to sweep successively over said relatively narrow recorded track at a substantially constant rate, each of said units serving to form a pulse as it crosses the track, means for comparing the time interval between pulses, and means for adjusting the spacing between transducer units until the time interval between the pulses is equalized.

3. Apparatus for equalizing the arcuate displacement of a plurality of transducer units mounted on a rotary member which comprises means for forming a recorded track which is relatively narrow in the direction of rotation of the transducer units, means for subsequently causing the transducer units to sweep successively over the recorded track at a substantially constant rate, each of said units serving to form a pulse as it crosses the track, means for determining the time interval between pulses, and means for adjusting the spacing between the transducer units until the time intervals are equalized.

4. Apparatus for equalizing the arcuate displacement of a plurality of transducer units mounted on a rotary member which comprises means for causing a recording medium to be moved longitudinally with respect to the rotary member, means for positioning the rotary member so that a pair of adjacent transducer units cooperates with the recording medium, means for energizing said transducer units whereby a pair of longitudinally spaced, relatively narrow, recorded tracks are formed, means for subsequently causing the transducer units to sweep successively over said relatively narrow recorded tracks at a substantially constant rate, one of said units serving to form a reference pulse as it crosses one recorded track, and an adjacent unit serving to form a timing pulse as it crosses the other recorded track, means for determining the time interval between reference and timing pulses, and means for adjusting the arcuate displacement of the transducer units until the time intervals are equalized.

5. Apparatus for equalizing the arcuate displacement of a plurality of transducer units mounted on a unitary rotary member which comprises a recorded element providing a calibrating input to each transducer as it sweeps said element, first and second signal channels adapted to be connected to adjacent transducer units, each of said channels including a means for receiving and shaping the output of a transducer and providing an output pulse corresponding with said calibrating input, and means for receiving said pulses and determining the time interval between the same.

6. Apparatus as in claim 5 in which said last named means comprises an oscilloscope, one of said pulses being applied to trigger the horizontal sweep, and the other to the vertical deflection circuits.

7. Apparatus as in claim 5 in which said last named means comprises an electronic time interval measuring apparatus.

References Cited in the file of this patent
UNITED STATES PATENTS

| | | |
|---|---|---|
| 2,470,839 | Zuschlag | May 24, 1949 |
| 2,475,742 | Hammond | July 12, 1949 |
| 2,782,626 | Jochum et al. | Feb. 26, 1957 |
| 2,831,069 | Snow | Apr. 15, 1958 |
| 2,876,295 | Irby | Mar. 3, 1959 |
| 2,915,593 | Brown | Dec. 1, 1959 |